US010664474B1

(12) United States Patent
Chunduru

(10) Patent No.: US 10,664,474 B1
(45) Date of Patent: May 26, 2020

(54) QUERY SYSTEM

(71) Applicant: Progress Software Corporation, Bedford, MA (US)

(72) Inventor: Raja Sekhar Chunduru, Hyderabad (IN)

(73) Assignee: Progress Software Corporation, Bedford, MA (US)

( * ) Notice: Subject to any disclaimer, the term of this patent is extended or adjusted under 35 U.S.C. 154(b) by 827 days.

(21) Appl. No.: 14/189,199

(22) Filed: Feb. 25, 2014

Related U.S. Application Data

(60) Provisional application No. 61/791,716, filed on Mar. 15, 2013.

(51) Int. Cl.
*G06F 16/2453* (2019.01)

(52) U.S. Cl.
CPC .............................. *G06F 16/24544* (2019.01)

(58) Field of Classification Search
CPC ..................... G06F 17/30466; G06F 16/24544
USPC .................................................. 707/713, 714
See application file for complete search history.

(56) References Cited

U.S. PATENT DOCUMENTS

| | | | |
|---|---|---|---|
| 5,241,648 A * | 8/1993 | Cheng | G06F 17/30498 |
| 6,298,338 B1 * | 10/2001 | Melton | G06F 17/30439 |
| | | | 705/7.29 |
| 6,374,232 B1 * | 4/2002 | Dageville | G06F 17/30327 |
| 6,457,000 B1 * | 9/2002 | Witkowski | G06F 17/3048 |
| 6,507,846 B1 * | 1/2003 | Consens | G06F 17/30324 |
| 6,654,039 B1 * | 11/2003 | Hollines, III | G06F 17/30595 |
| | | | 707/999.003 |
| 6,738,769 B2 * | 5/2004 | Sharp | G06F 17/3053 |
| 6,754,653 B2 * | 6/2004 | Bonner | G06F 17/30595 |
| 6,757,671 B1 * | 6/2004 | Galindo-Legaria | |
| | | | G06F 17/30321 |
| 6,856,996 B2 * | 2/2005 | Chow | G06F 17/3041 |
| 6,865,577 B1 * | 3/2005 | Sereda | G06F 17/3033 |
| | | | 707/699 |
| 6,898,593 B1 * | 5/2005 | Mulukutla | G06F 17/30466 |
| 7,567,952 B2 * | 7/2009 | Muras | G06F 17/30433 |
| 7,870,119 B2 * | 1/2011 | Wason | G06F 17/30554 |
| | | | 707/706 |
| 7,979,440 B2 * | 7/2011 | Fuh | G06F 17/30864 |
| | | | 707/741 |
| 8,468,150 B2 * | 6/2013 | Attaluri | G06F 17/30492 |
| | | | 707/714 |
| 8,478,775 B2 * | 7/2013 | Netz | G06F 17/30501 |
| | | | 707/769 |
| 8,635,195 B2 * | 1/2014 | Christian | H03M 7/4037 |
| | | | 707/693 |
| 8,838,894 B2 * | 9/2014 | Potapov | G06F 12/0207 |
| | | | 707/810 |
| 9,514,187 B2 * | 12/2016 | Ziauddin | G06F 17/30486 |
| 9,805,091 B2 * | 10/2017 | Cui | G06F 17/30448 |
| 2004/0249827 A1 * | 12/2004 | Bhogal | G06F 17/30418 |
| 2006/0036616 A1 * | 2/2006 | Bastawala | G06F 17/30457 |

(Continued)

*Primary Examiner* — Miranda Le
(74) *Attorney, Agent, or Firm* — Patent Law Works LLP

(57) ABSTRACT

A system and method for efficient query processing using a real index of a queried table are described. In one embodiment, the real index is used in an offset query type in order to reduce the number of rows that are sorted and thereby increases efficiency for processing offset query types. In another embodiment, the real index is used in a set operation query type where existing systems utilize a table scan and thereby increases efficiency of set operation query types.

9 Claims, 16 Drawing Sheets

(56) References Cited

U.S. PATENT DOCUMENTS

| | | | |
|---|---|---|---|
| 2006/0161546 A1* | 7/2006 | Callaghan | G06F 17/30595 |
| 2007/0244849 A1* | 10/2007 | Predovic | G06F 17/30595 |
| 2009/0063458 A1* | 3/2009 | Beavin | G06F 17/30486 |
| 2010/0088315 A1* | 4/2010 | Netz | G06F 17/30501 |
| | | | 707/737 |
| 2012/0124045 A1* | 5/2012 | Pendap | G06F 17/30498 |
| | | | 707/737 |

* cited by examiner

Example Query Scenario 1: ⌐⌙ 502

//Assume the following tables are created in the database
   Create table TABLEA (a1 int, a2 int);
   Create table TABLEB (b1 int, b2 int);
   Create table TABLEC (c1 int, c2 int);

//Assume the following real, composite indices are created
   Create index indB1 on TABLEB(b1, b2);
   Create index indC1 on TABLEC(c1, c2); ⌐⌙ 506
   Create index indA1 on TABLEA(a1, a2);

//Assume that the following query is received
   Select * from TABLEA,
      (select * from TABLEB union select * TABLEC) dt(i,j) ⌐⌙ 508
   where a1=i and a2=j;

Potential Optimization Plan Options ⌐⌙ 504

A.   TABLE SCAN on TABLEA
      TABLE SCAN on TABLEB                       } 504a
      TABLE SCAN on TABLEC
      Nested LOOP join on TABLEA and grouping of TABLEB, TABLEC B.   TABLE SCAN on TABLEB
      TABLE SCAN on TABLEC
      INDEX SCAN indA1 ON TABLEA               } 504b
      INDEXED join on grouping of TABLEB, TABLEC and TABLEA

Figure 5

Example Query Scenario 2: ⌐⌐ 602

```
//Assume the following tables are created in the database
Create table TABLEA (a1 int, a2 int);
Create table TABLEB (b1 int, b2 int);
Create table TABLEC (c1 int, c2 int);

//Assume the following real, composite indices are created    ⌐⌐ 606
Create index indB1 on TABLEB(b1, b2);
Create index indC1 on TABLEC(c1, c2);

//Assume that the following query is received
Select * from TABLEA,
    (select * from TABLEB union select * TABLEC) dt(i,j)    ⌐⌐ 508
where a1=i and a2=j;
```

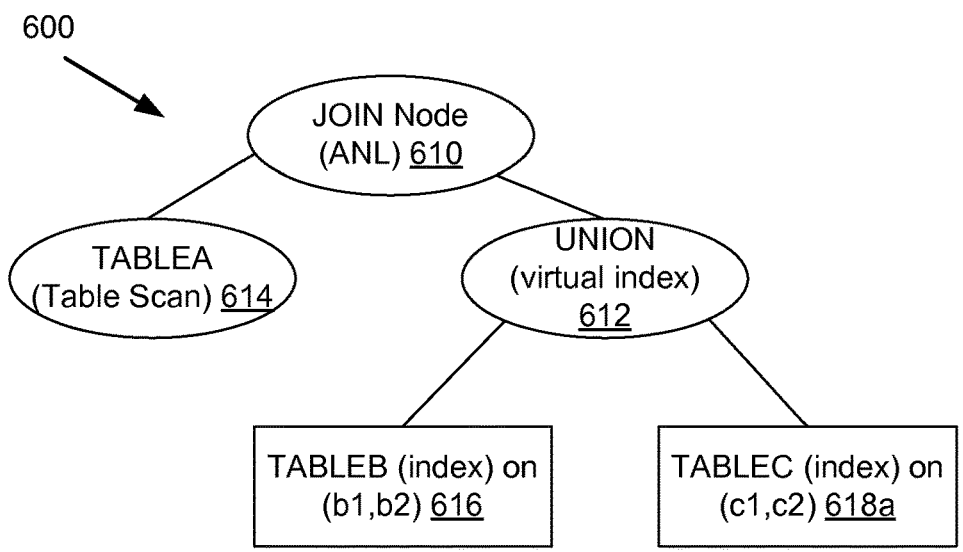

Figure 6

Example Query Scenario 3: ⌐__ 702

```
//Assume the following tables are created in the database
Create table TABLEA (a1 int, a2 int);
Create table TABLEB (b1 int, b2 int);
Create table TABLEC (c1 int, c2 int);

//Assume the following real indices are created  ⌐__ 706
Create index indB1 on TABLEB(b1, b2);
Create index indC1 on TABLEC(c2);

//Assume that the following query is received
Select * from TABLEA,
    (select * from TABLEB union select * TABLEC) dt(i,j)   ⌐__ 508
where a1=i and a2=j;
```

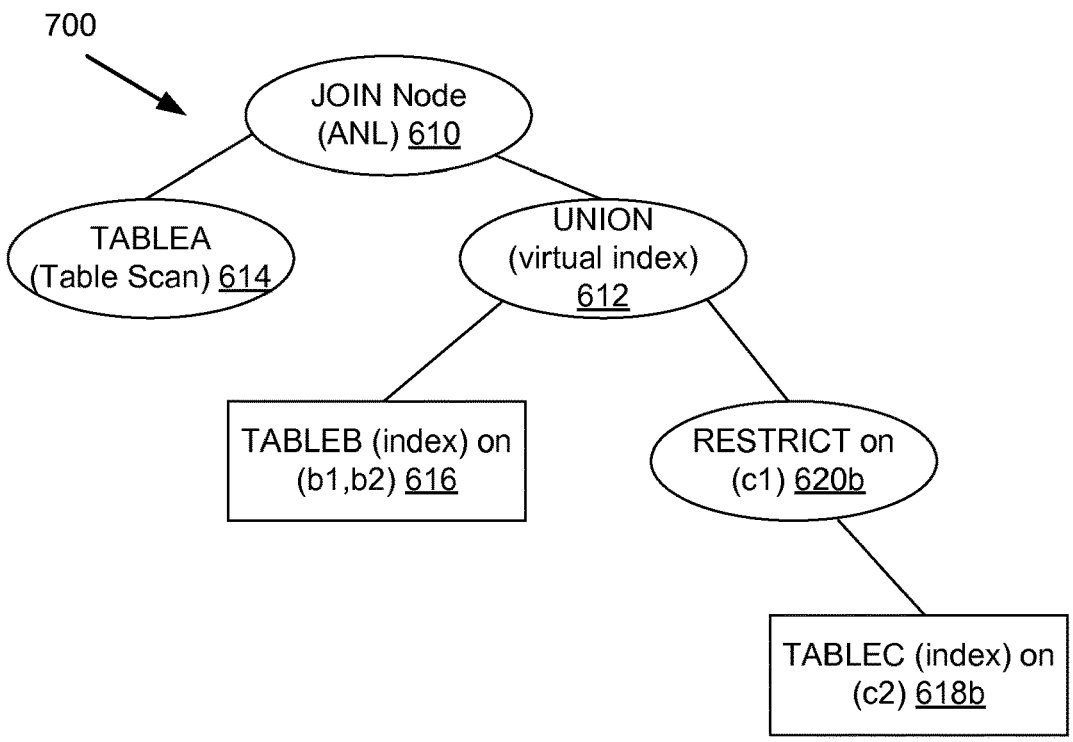

Figure 7

Example Query Scenario 4: ⌐ 802

```
//Assume the following tables are created in the database
Create table TABLEA (a1 int, a2 int);
Create table TABLEB (b1 int, b2 int);
Create table TABLEC (c1 int, c2 int);

//Assume the following real, composite index is created  ⌐  806
Create index indB1 on TABLEB(b1, b2);

//Assume that the following query is received
Select * from TABLEA,
    (select * from TABLEB union select * TABLEC) dt(i,j)  ⌐  508
where a1=i and a2=j;
```

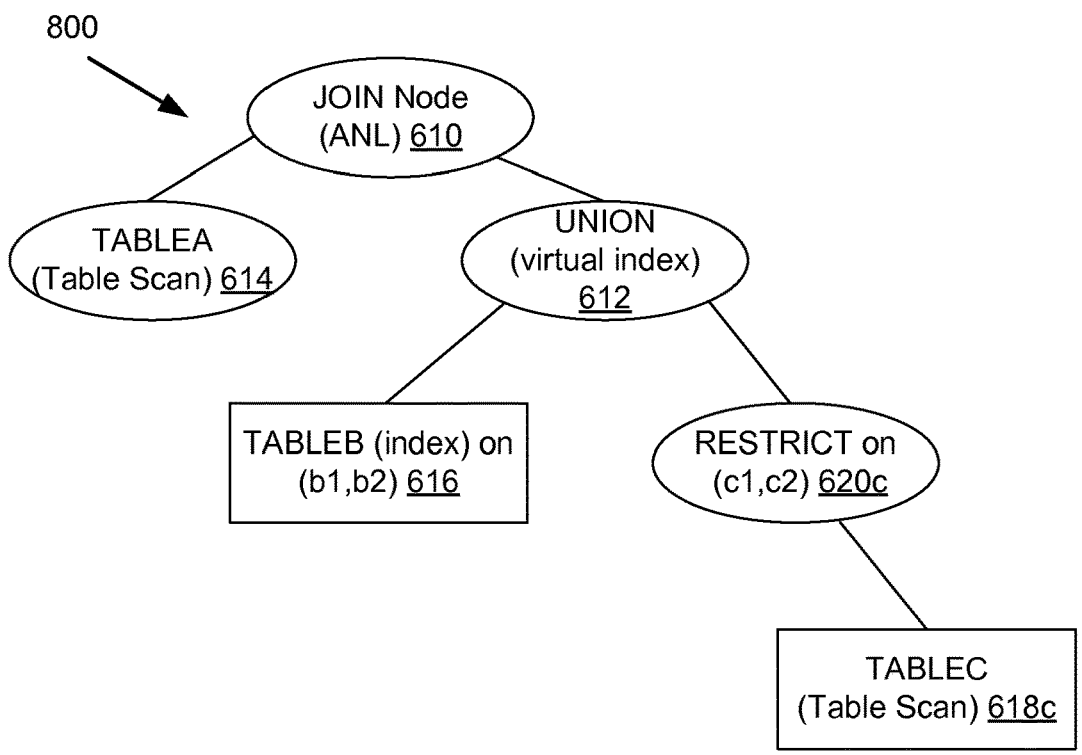

Figure 8

Example A Query Conditions:

Assume the following table is in the database
    Create table tab1 (col1 integer, col2 integer);

Assume the following index is created
    Create index idx1 on tab1 (col1 );

Assume that the following query is received
    select * from tab1 order by col1,col2 offset 3 rows fetch first 3 rows only
                                                                 1102

Assume "tab1" is the following table

| col1 | col2 |
|------|------|
| 4 | 5 |
| 1 | 1 |
| 5 | 10 |
| 6 | 9 |
| 4 | 8 |
| 2 | 3 |
| 4 | 7 |
| 5 | 7 |
| 6 | 1 |

1104

Example A (PRIOR ART) Query Scenario A:
1. Select table scan to retrieve rows  1202
    According to Example A, the result looks something like:
    | col1 | col2 |
    |------|------|
    | 4    | 5    |
    | 1    | 1    |
    | 5    | 10   |
    | 6    | 9    |
    | 4    | 8    |
    | 2    | 3    |
    | 4    | 7    |
    | 5    | 7    |
    | 6    | 1    |
    1104
2. Sort all rows on columns col1 and col2.  1206
    According to Example A, the result looks something like:
    | col1 | col2 |
    |------|------|
    | 1    | 1    |
    | 2    | 3    |
    | 4    | 5    |
    | 4    | 7    |
    | 4    | 8    |
    | 5    | 7    |
    | 5    | 10   |
    | 6    | 1    |
    | 6    | 9    |
    1208
3. Skip first 3 rows and return the next 3 rows  1210
    | col1 | col2 |
    |------|------|
    | 4    | 7    |
    | 4    | 8    |
    | 5    | 7    |
    1212
Figure 12

Example A Query Scenario B:

1. Select index scan to retrieve rows. ⟵ 1302

According to Example A, the result looks something like:

| col1 | col2 |
   |------|------|
   | 1    | 1    |
   | 2    | 3    |
   | 4    | 5    |
   | 4    | 8    |
   | 4    | 7    |
   | 5    | 10   |
   | 5    | 7    |
   | 6    | 9    |
   | 6    | 1    |

⟵ 1304

2. Determine index values of the row(s) to be fetched. ⟵ 1306

According to Example A, which offsets the first 3 rows and fetches the next three rows, the row(s) to be fetched have either a col1 value of "4" or "5"

3. Sort rows having the determined col1 values. ⟵ 1308

According to Example A, the result looks something like:

| col1 | col2 |
   |------|------|
   | 1    | 1    |
   | 2    | 3    |
   | 4    | 5    |
   | 4    | 7    |
   | 4    | 8    |
   | 5    | 7    |
   | 5    | 10   |
   | 6    | 9    |
   | 6    | 1    |

⟵ 1310

*Note: Entries for col1 values of "6" remain unsorted. If multiple entries existed for col1 values of "1," "2," or "3" existed, those are not necessarily sorted according to one embodiment.

4. Output the appropriate rows after sorting ⟵ 1312

| col1 | col2 |
   |------|------|
   | 4    | 7    |
   | 4    | 8    |
   | 5    | 7    |

Example pseudo algorithm for Achieving Scenario B of Example A:

1. Choose index scan to retrieve rows from the table and intimate sort engine about columns on input rows to sort engine are sorted. ⟵ 1502

2. During query processing push OFFSET and FETCH values down to the sort engine. ⟵ 1504

3. Define variables: ⟵ 1506

ALL_SORT_KEYS = { set of columns on which ordering is required as specified in query }. For the Example A query, this set would be {col1, col2}
   DONE_SORT_KEYS = {set of columns on which rows are already ordered by reading index}. For the Example A query, this is {col1}
   WORK_SORT_KEYS = { list of columns on which sorting needs to be performed }. For the Example A query, this set would be {col2}.
   CURRENT_WORKING_SET = { set of rows having same value for all columns in DONE_SORT_KEY }.
   OUTPUT_ROWS = { object which stores final sorted result set. Usually this refers to an object on disk. May be a temp table on disk}
   ROW_COUNT = an integer which counts number of rows. Initial value for this variable is 0.
   SKIPPED_ROW_COUNT = an integer variable which counts number rows skipped. Initial value for this variable is 0.
   OFFSET_VALUE = OFFSET value provided in the query
   FETCH_VALUE = FETCH value provided in the query.
   INPUT_ROW = This variable points to input record to the sort engine.
   PREVIOUS_INPUT_ROW = This variable points to previous row.

(Continues in Fig. 15B)

Figure 15A

Example pseudo algorithm for Achieving Scenario B of Example A (Continued):

4.     For each input record INPUT_ROW to the sort engine —⌐— 1508
        Do
            ROW_COUNT++
            if ROW_COUNT <= OFFSET_VALUE + 1
            Then 1508a:
                Compare DONE_SORT_KEYS values of INPUT_ROW with that of values for any record in CURRENT_WORKING_SET.
                If DONE_SORT_KEY values for both records are different (INPUT_ROW doesn't belongs to CURRENT_WORK_SET)
                Then
                    Add number of rows in CURRENT_WORKING_SET to SKIPPED_ROW_COUNT.
                    Delete all records in CURRENT_WORKING_SET (as these rows will be omitted/skipped anyway).
                End if
                Add this INPUT_ROW to CURRENT_WORKING_SET.

Else
            If ROW_COUNT > OFFSET_VALUE + FETCH_VALUE
            THEN

1508b:
                If DONE_SORT_KEY values for INPUT_ROW and PREVIOUS_INPUT_ROW are equal
                Then
                    Add the INPUT_ROW to CURRENT_WORKING_SET
                Else
                    We got all required rows to prepare final output sorted resulted set.
                    So sort all records in CURRENT_WORKING_SET on WORK_SORT_KEYS.

Skip (OFFSET_VALUE – SKIPPED_ROW_COUNT) rows in CURRENT_WORKING_SET and read FETCH_VALUE amount of rows from CURRENT_WORKING_SET and add them to OUTPUT_ROWS.

As all needed rows are now in OUTPUT_ROWS, no need to sort remaining input rows. So come out of this for loop to return sorted rows to caller (step 5).
                End if
            Else 1508c:
                Add this INPUT_ROW to CURRENT_WORKING_SET.
            End if
            End if
            PREVIOUS_ROW = INPUT_ROW.
        Done 5.     Read rows from OUTPUT_ROWS and return rows to caller. —⌐— 1510

Figure 15B

Intermediary Steps for Pseudo Algorithm of Figures 15A and 15B Applied to Example A:
1. Select index scan to retrieve rows  1602
| col1 | col2 |
|------|------|
| 1 | 1 |
| 2 | 3 |
| 4 | 5 |
| 4 | 8 |
| 4 | 7 |
| 5 | 10 |
| 5 | 7 |
| 6 | 9 |
| 6 | 1 |
1304
2. Step-by-step execution based on pseudo algorithm  1606
| INPUT_ROW | ROW_COUNT | CURRENT_WORKING_SET | OUTPUT_ROWS |
|-----------|-----------|---------------------|-------------|
|  | 0 | Empty | Empty |
| (1,1) | 1 | {(1,1)} | Empty |
| (2,3) | 2 | {(2,3)} | Empty |
| (4,5) | 3 | {(4,5)} | Empty |
| (4,8) | 4 | {(4,5), (4,8)} | Empty |
| (4,7) | 5 | {(4,5), (4,8), (4,7)} | Empty |
| (5,10) | 6 | {(4,5), (4,8), (4,7), (5,10)} | Empty |
| (5,7) | 7 | {(4,5), (4,8), (4,7), (5,10), (5,7)} | {(4,7), (4,8), (5,7)} |
1608
Figure 16

QUERY SYSTEM

CROSS-REFERENCE TO RELATED APPLICATIONS

The present application claims priority, under 35 U.S.C. § 119, of U.S. Provisional Patent Application No. 61/791,716, filed Mar. 15, 2013 and entitled "Query System," the entirety of which is hereby incorporated by reference.

FIELD OF INVENTION

The present disclosure relates to query systems. Specifically, the present disclosure relates to providing optimization and efficient processing of queries.

BACKGROUND

Over the years, the cost of storing data has been reduced as memory technologies have advanced. This reduction in the cost of storing data coincides with a trend to store more data in databases as well as a trend to store data in larger databases. With a growth in the size of databases, the need for efficient methods and systems for locating and retrieving, or otherwise accessing, data therefrom is of increasing importance. Accordingly, what is needed are efficient methods for query processing and optimization.

Data access may use mechanisms such as a table scans and index scans. Generally, an index scan is faster and more efficient than a table scan. Therefore, what is needed are methods for query processing that utilize an index scan, or similar mechanism, to provide greater efficiency, whether in terms of time or hardware resources (e.g. processing, bandwidth, etc.), to process a given query.

SUMMARY

In general, an innovative aspect of the subject matter described in this disclosure may be embodied in methods that include responsive to receiving an offset query, index scanning, using one or more processors, a queried table on a first column, wherein the first column comprises an index of the queried table; determining, using the one or more processors, a subset of one or more rows from the index scanned query table; sorting, using the one or more processors, the subset of rows based in part on a second column; and determining, using the one or more processors, based on the offset query, one or more output rows to be fetched from the sorted subset of rows.

In general, another innovative aspect of the subject matter described in this disclosure may be embodied in methods that include responsive to receiving an offset query, index scanning, using one or more processors, a queried table on a first sort key, the index scan generating a first indexed table, the first indexed table ordered according to the first sort key, the offset query including an offset value and a fetch value; for each row in the first indexed table beginning with a first row of the first indexed table and proceeding sequentially through the rows to a final row: (1) retrieving, using the one or more processors, a row from the indexed table; and (2) determining, using the one or more processors, the row's position in the indexed table relative to an offset value and a fetch value and determining whether to add the row to a working set based in part on the row's position prior to retrieving a next row; responsive to determining the final row is reached, sorting, using the one or more processors, the working set based in part on a second sort key; and determining, using the one or more processors, based on the offset query and skipped row count, one or more output rows to be fetched from the sorted working set.

In general, another innovative aspect of the subject matter described in this disclosure may be embodied in methods that include receiving, using one or more processors, a set operation query including at least one join type operator and at least on union type operator and identifying at least three queried tables including at least two unioned tables; adding, using the one or more processors, one or more set operator nodes to a query tree, a set operator node corresponding to a set operator in the set operation query; inserting, using the one or more processors, a retrieval node for each queried table into the query tree, wherein a retrieval node for at least one unioned table corresponds to an index scan of that unioned table; and selecting, using the one or more processors, the query tree based on a sum of one or more real indices associated with the at least two unioned tables.

According to yet other innovative aspects of the subject matter described in this disclosure, one or more systems comprising a processor; and a memory storing instructions that, when executed, cause the system to perform one of the methods described above.

Other implementations of one or more of these aspects include corresponding systems, apparatus, and computer programs, configured to perform the actions of the methods, encoded on computer storage devices. These and other implementations may each optionally include one or more of the following features.

It should be understood that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIG. 5-8 are example query scenarios according to some embodiments.

FIG. 12 is a potential query scenario used by existing systems.

FIG. 13 is an example of a query scenario according to some embodiments.

FIGS. 15A-15B are an example pseudo algorithm for offset and ordering optimization according to one embodiment.

FIG. 16 are examples of intermediary results according to one embodiment of the pseudo algorithm for offset and ordering optimization.

DETAILED DESCRIPTION

Figure 1:
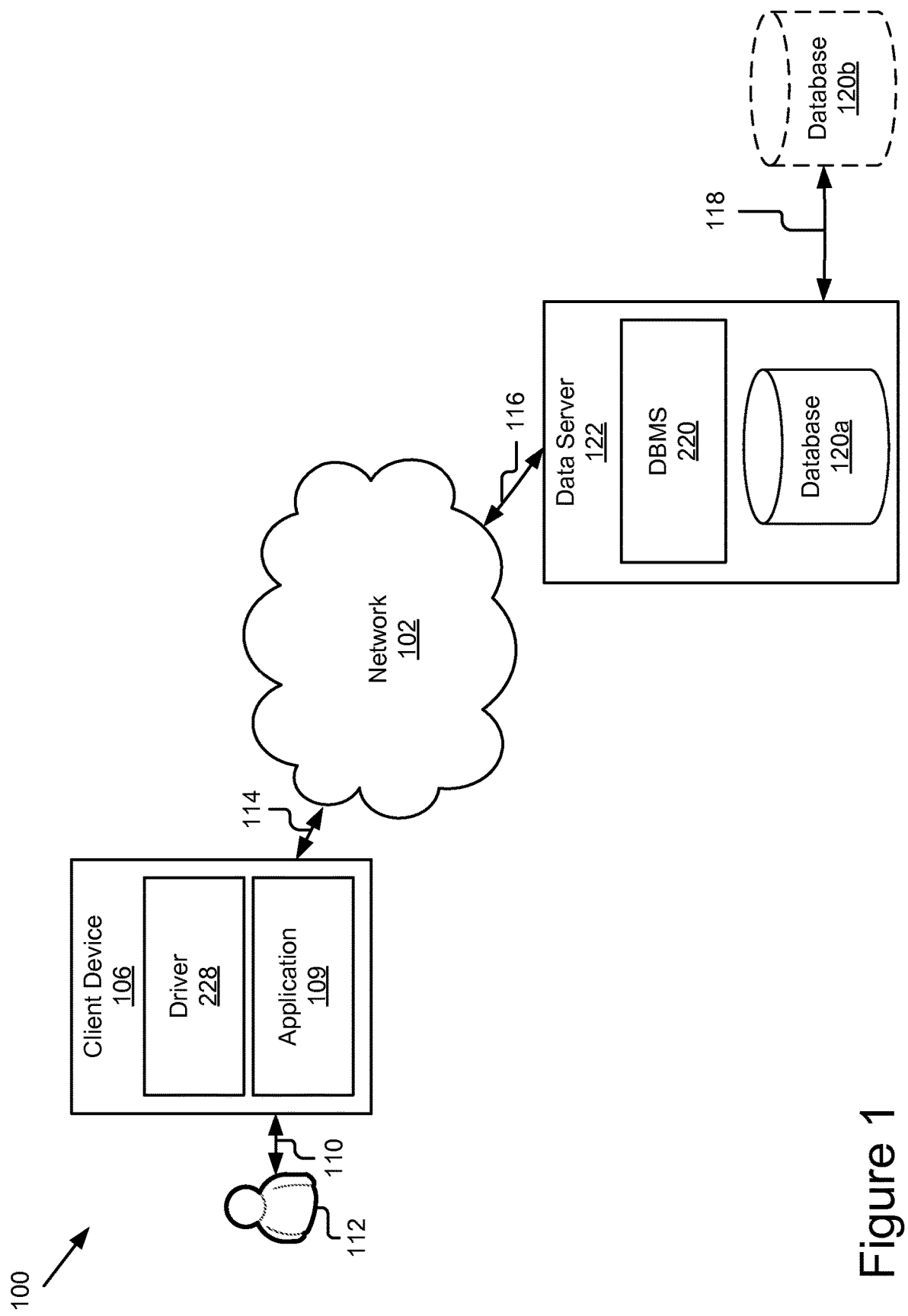
FIG. 1 is a block diagram illustrating an example query system according to one embodiment.

FIG. 1 is a block diagram illustrating an example system 100 for processing a query according to one embodiment. The illustrated system 100 includes a client device 106 and a data server 122, which are communicatively coupled via a network 102 for interaction with one another. For example, the client devices 106 may be coupled to the network 102 via signal line 114. The data server 122 may be coupled to the network 102 via signal line 116. In some embodiments, the client device 106 may be accessed by a user 112 as illustrated by line 110. The system 100 includes one or more databases (referred to individually as database 120 and collectively as databases 120). The one or more databases may be included in the data server 122 as illustrated by database 120*a*, coupled to the data server 122 as a direct access storage (DAS) illustrated by database 120*b* and line 118, coupled to the data server 122 via the network 102 as a network accessible storage (NAS) (not shown), or a combination thereof.

The network 102 may include any number of networks and/or network types. For example, the network 102 may include, but is not limited to, one or more local area networks (LANs), wide area networks (WANs) (e.g., the Internet), virtual private networks (VPNs), mobile networks (e.g., the cellular network), wireless wide area network (WWANs), Wi-Fi networks, WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless (e.g., terrestrial or satellite-based transceivers) networking software and/or hardware that interconnects the computing devices of the system 100. For example, the network 102 may include packet-switching devices that route the data packets to the various computing devices based on information included in a header of the data packets.

The data exchanged over the network 102 can be represented using technologies and/or formats including the hypertext markup language (HTML), the extensible markup language (XML), JavaScript Object Notation (JSON), Binary JavaScript Object Notation, Comma Separated Values (CSV), etc. In addition, all or some of links can be encrypted using conventional encryption technologies, for example, the secure sockets layer (SSL), Secure Hypertext Transfer Protocol (HTTPS) and/or virtual private networks (VPNs) or Internet Protocol security (IPsec). In another embodiment, the entities can use custom and/or dedicated data communications technologies instead of, or in addition to, the ones described above. Depending upon the embodiment, the network 102 can also include links to other networks.

The client device 106 is a computing device having data processing and communication capabilities. While FIG. 1 illustrates one client device 106, the present specification applies to any system architecture having one or more client devices 106. In some embodiments, a client device 106 may include a processor (e.g., virtual, physical, etc.), a memory, a power source, a network interface, and may include other components whether software or hardware, such as a display, graphics processor, wireless transceivers, input devices (e.g. mouse, keyboard, camera, sensors, etc.) firmware, operating systems, drivers, various physical connection interfaces (e.g., USB, HDMI, etc.). The client devices 106 may couple to and communicate with one another and the other entities (e.g. data server 122) of the system 100 via the network 102 using a wireless and/or wired connection.

Examples of client devices 106 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While one client device 106 is depicted in FIG. 1 for clarity and convenience, the system 100 may include any number of client devices 106. In addition, the any number of client devices 106 may be the same or different types of computing devices 106. In the depicted embodiment, the client device 106 includes an instance of a driver 228 and an application 109.

The application 109 may be storable in a memory and executable by a processor of a client device 106. In one embodiment, the application 109 requests and uses data which is stored by one or more data sources 120. The application 109 may be any application written in any language. For example, the application 109 may be one of a Java, a C, a C++ and Microsoft.net application. It should be recognized that the preceding are merely examples of applications 109 and others exist.

The driver 228 may be storable in a memory and executable by a processor of a client device 106. The driver 228 may refer to a traditional driver, e.g. a JDBC driver or ODBC driver, or a client library, e.g. an HTTP client library to communicate using REST protocols. In one embodiment, the driver 228 is a standards based driver. For example, in some embodiments, the driver 228 uses one or more of the open database connectivity (ODBC), Java database connectivity (JDBC) and REST protocols. In one embodiment, the driver 228 communicates with the database management system (DBMS) 220 to expose and provide the application 109 access to data stored by one or more databases 120.

The data server 122 may include one or more computing devices having data processing, storing, and communication capabilities. For example, the data server 122 may include one or more hardware servers, server arrays, storage devices, systems, etc., and/or may be centralized or distributed/cloud-based. In some implementations, the data server 122 may include one or more virtual servers, which operate in a host server environment and access the physical hardware of the host server including, for example, a processor, memory, storage, network interfaces, etc., via an abstraction layer (e.g., a virtual machine manager).

In one embodiment, the data server 122 includes the DBMS 220 module. The DBMS 220 module may be storable in a memory and executable by a processor of a data server 122 to provide access to data stored by a database 120. For example, in one embodiment, the DBMS 220 provides an application 109 using a driver 228 access to data stored by a database 120 via the network 102.

It should be recognized that while the examples and description herein may refer to embodiments that use the Structured Query Language (SQL), which is a relational DBMS. Other relational DBMS and non-relational (e.g. NoSQL) DBMS exist and the disclosure herein may be adapted and applied to a DBMS that does not use SQL. A database 120 may be stored on one or more non-transitory computer-readable mediums for storing data.

It should be understood that the system 100 illustrated in FIG. 1 is representative of an example query system according to one embodiment and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 100 may be integrated into to a single computing device or system or additional computing devices or systems may be included. For example, in one embodiment, the application 109, driver 228, the DBMS 228 and database 120 may be included in a single computing device (not shown).

Figure 2:
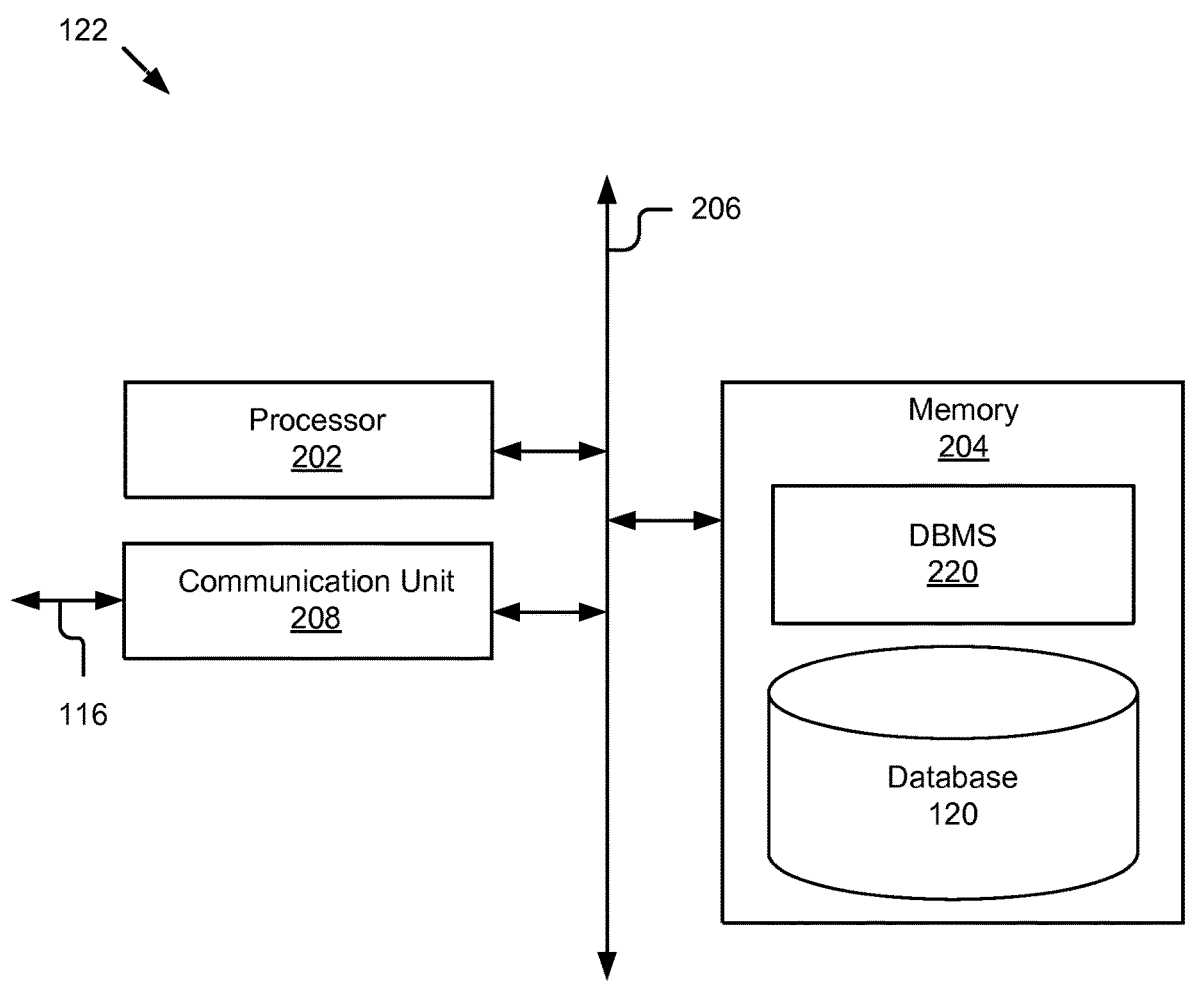
FIG. 2 is a block diagram illustrating an example data server according to one embodiment.

FIG. 2 is a block diagram of an example data server 122 according to one embodiment. The data server 122, as illustrated, may include a processor 202, a memory 204 and a communication unit 208, which may be communicatively coupled by a communications bus 206. The data server 122 depicted in FIG. 2 is provided by way of example and it should be understood that it may take other forms and include additional or fewer components without departing from the scope of the present disclosure. For example, while not shown, the data server 122 may include input and output devices (e.g., one or more of a display, a keyboard, a mouse, touch screen, speakers, microphone, camera, sensors, etc.), various operating systems, sensors, additional processors, and other physical configurations.

The processor 202 may execute code, routines and software instructions by performing various input/output, logical, and/or mathematical operations. The processor 202 have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some implementations, the processor 202 may be capable of generating and providing electronic display signals to a display device (not shown), supporting the display of images, capturing and transmitting images, performing complex tasks including various types of feature extraction and sampling, etc. In some implementations, the processor 202 may be coupled to the memory 204 via the bus 206 to access data and instructions therefrom and store data therein. The bus 206 may couple the processor 202 to the other components of the data server 122 including, for example, the memory 204 and communication unit 208.

The memory 204 may store and provide access to data to the other components of the data server 122. In some implementations, the memory 204 may store instructions and/or data that may be executed by the processor 202. For example, in the illustrated embodiment, the memory 204 may store the DBMS 220 module. The memory 204 is also capable of storing other instructions and data, including, for example, an operating system, hardware drivers, other software applications, databases, etc. The memory 204 may be coupled to the bus 206 for communication with the processor 202 and the other components of the data server 122.

The memory 204 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. In some embodiments, the memory 204 may include one or more of volatile memory and non-volatile memory. For example, the memory 204 may include, but is not limited, to one or more of a dynamic random access memory (DRAM) device, a static random access memory (SRAM) device, a discrete memory device (e.g., a PROM, FPROM, ROM), a hard disk drive (HDD), an optical disk drive (CD, DVD, Blu-ray™, etc.). It should be understood that the memory 204 may be a single device or may include multiple types of devices and configurations. For example, in one embodiment, the database 120 may be stored on a HDD and portions may be read into RAM for processing by the processor 202. In one embodiment, the memory 204 includes the DBMS 220 and a database 120.

The bus 206 can include a communication bus for transferring data between components of a data server 122 and/or between computing devices (e.g. between the data server 122 and the client device 106), a network bus system including the network 102 or portions thereof, a processor mesh, a combination thereof, etc. In some implementations, the DBMS 220, its sub-components and various other software operating on the data server 122 (e.g., an operating system, etc.) may cooperate and communicate via a software communication mechanism implemented in association with the bus 206. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 208 may include one or more interface devices (I/F) for wired and/or wireless connectivity with the network 102. For instance, the communication unit 208 may include, but is not limited to, CAT-type interfaces; wireless transceivers for sending and receiving signals using radio transceivers (4G, 3G, 2G, etc.) for communication with the mobile network 102, and radio transceivers for Wi-Fi™ and close-proximity (e.g., Bluetooth®, NFC, etc.) connectivity, etc.; USB interfaces; various combinations thereof; etc. In some implementations, the communication unit 208 can link the processor 202 to the network 102, which may in turn be coupled to other processing systems. The communication unit 208 can provide other connections to the network 102 and to other entities of the system 100 using various standard network communication protocols.

Example Database Management System (DBMS) 220 Module

Figure 3:
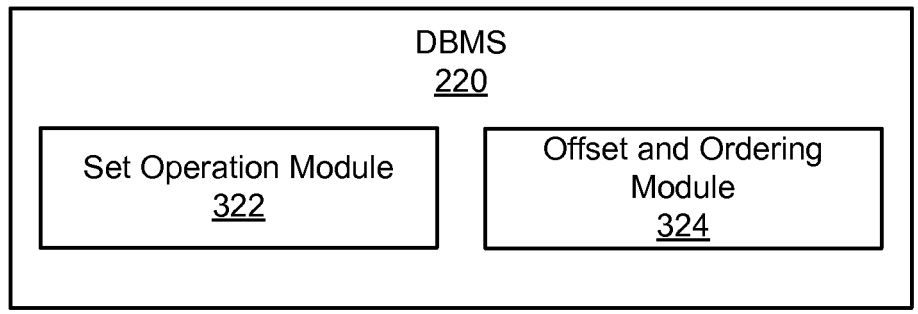
FIG. 3 is block diagram illustrating an example database management system according to one embodiment.

Referring now to FIG. 3, the DBMS 220 module is shown in more detail according to one embodiment. FIG. 3 is a block diagram of the DBMS 220 module included in a data server 122 according to one embodiment.

The DBMS 220 provides access to data stored by a database 120. For example, in one embodiment, the DBMS 220 provides an application 109 using a driver 228 access to data stored by a database 120 via the network 102. In one embodiment, the DBMS 220 receives a query requesting access to and/or manipulation of data, parses the query (e.g. to determine permissions, semantics, syntax, etc.), generates and optimizes a query plan for accessing and/or manipulating the data as requested and executes the plan to access and/or manipulate the requested data.

As the number of databases, the size of databases and the number of queries made on a database increase, the efficiency of query processing and, therefore, the optimization of the query plan becomes increasingly important. The present disclosure provides a DBMS 220 for processing one or more of a set operation type query and an offset type query, which may provide more efficient processing than current DBMS systems.

In the illustrated embodiment, the DBMS 220 includes a set operation module 322 and an offset and ordering module 324. However, it should be recognized that, according to some embodiments, one of the set operation module 322 and its features and functionality and the offset and ordering module 324 and its features and functionality may be omitted from the DBMS 220. It should also be recognized that the modules 322 and 324, comprised in the DBMS 220 module may not necessarily all reside on the same data server 122. In one embodiment, the modules 322, 324 and/or their functionality are distributed across multiple data servers 122.

The set operation module 322 includes code and routines for generating and selecting an optimized query plan for a set operation type query. In one embodiment, the set operation module 322 is a set of instructions executable by the processor 202. In another embodiment, the set operation module 322 is stored in the memory 204 and is accessible and executable by the processor 202. In either embodiment, the set operation module 322 is adapted for cooperation and communication with the processor 202, other components of the data server 122 and other components of the DBMS 220 module. The features and functionality of the set operation module 322 are discussed in detail below with reference to FIGS. 5-9.

The offset and ordering module 324 includes code and routines for generating, optimizing and executing a query plan for an offset type query. In one embodiment, the offset ordering module 324 is a set of instructions executable by the processor 202. In another embodiment, the offset and ordering module 324 is stored in the memory 204 and is accessible and executable by the processor 202. In either embodiment, the offset and ordering module 324 is adapted for cooperation and communication with the processor 202, other components of the data server 122 and other components of the DBMS 220 module. The features and functionality of the offset and ordering module 324 are discussed in detail below with reference to FIGS. 10-17.

Example Set Operation Module 322

Figure 4:
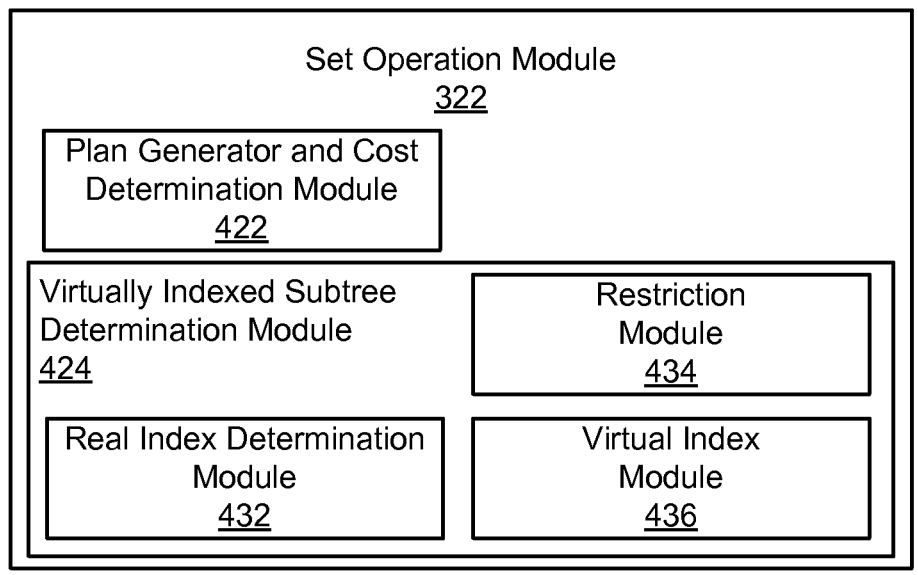
FIG. 4 is a block diagram illustrating an example of a set operation module according to one embodiment.

Referring now to FIG. 4, a set operation module 322 is shown in more detail according to one embodiment. FIG. 4 is a block diagram illustrating an example of a set operation module 322 according to one embodiment.

The set operation module 322 provides optimization for set operation type query, which may occasionally be referred to simply as a "set operation query" herein. A set operation query is a query type that includes one or more set operators. Generally, a set operation takes data from different source tables and groups the data. Examples of set operators may include, but are not limited to unions, such as UNION and UNION ALL, and joins, such as INNER, LEFT OUTER, RIGHT OUTER, FULL OUTER and CROSS joins.

In one embodiment, the set operation query is a Structured Query Language (SQL) query. For example, the types of unions and joins listed in the paragraph above refer to SQL set operators. However, it should be recognized that SQL is merely one embodiment and referred to for clarity and convenience, and the teachings herein may be adapted and applied to other query languages and databases without departing from this disclosure.

Set operation queries, particularly those including a join, may be complex and computationally and time intensive to execute. For example, when performing a nested loop join, the cost of a join is the size of the outer table multiplied by the size of the inner table. Index structures may be utilized to increase efficiency, since index scans are generally faster and less resource intensive than table scans. However, a table does not always have an index. Therefore, what are needed are systems and methods that can provide the advantages of index scans for a queried table lacks an index.

Referring now to FIG. 5, Example Query Scenario 1 502 is described. In Example Query Scenario 1 502, three tables (TABLEA, TABLEB and TABLEC) are created and a second order (i.e. two column) composite index is created for each of the three tables 506, such that TABLEA has index (a1,a2), TABLEB has index (b1,b2) and TABLEC has index (c1,c2). In Example Scenario 1 502, the query 508 "Select *TABLEA, (select * from TABLEB union select *TABLEC) dt(i,j) where a1=i and a2=j" is received.

To better understand the differences and advantages of the set operation module 322 over existing systems, it is useful to compare its set operation query processing to that of existing systems. Therefore, Example Query Scenario 1 502 of FIG. 5 illustrates a first example query scenario, and the indexes 506 of the tables of Example Query Scenario 1 502 are modified in various different ways to create Example Query Scenario 2 602 of FIG. 6, Example Query Scenario 3 702 of FIG. 7, and Example Query Scenario 4 802 of FIG. 8, to better illustrate and explain how the set operation module 322 behaves in each scenario. It should be recognized that these example scenarios 502, 602, 702, 802 are merely examples provided for clarity and convenience and neither limit this disclosure nor its application to other scenarios. For example, the disclosure herein may be applied to query scenarios having one or more of a different number of tables, a different number of set operations, a different number of tables associated with an index, table(s) having different order(s) of indices, different data types in the tables, etc. than those described in the example scenarios 502, 602, 702, 802 without departing from the disclosure herein.

Referring now to FIG. 4, in some embodiments, the set operation module 322 may include a plan generator and cost determination module 422 and a virtually indexed subtree determination module 422. In some embodiments, the virtually indexed subtree module may include a real index determination module 432, a restriction module 434 and a virtual index module 436. It will be recognized that the modules 422, 424, 432, 434, 436 comprised in the set operation module 322 may not necessarily all reside on the same data server 122. In one embodiment, the modules 422, 424, 432, 434, 436 and/or their functionality are distributed across multiple data servers 122.

A sub-module 422/424/432/434/436 of the set operation module 322 may include code and routines for providing the functionality associated with the sub-module as described below. In some embodiments, a sub-module 422/424/432/434/436 includes a set of instructions executable by the processor 202. In some embodiments, a sub-module 422/424/432/434/436 is stored in the memory 204 and are accessible and executable by the processor 202. Regardless, a sub-module 422/424/432/434/436 is adapted for cooperation and communication with the processor 202, other components of the data server 122 and other components (e.g. other sub-modules) of the set operation module 322.

The plan generator and cost determination module 422 receives a set operation query. In one embodiment, the plan generator and cost determination module 422 receives a query including a join type set operator and a union type set operator. For example, the plan generator and cost determination module 422 receives the query 508 of Example Query Scenario 1 502, which requests a join of TABLEA to the union of TABLEB and TABLEC.

The plan generator and cost determination module 422 generates one or more potential optimization plan options, occasionally referred to individually as a "plan" or collectively as "plans," for executing the received set operation query, determines a cost associated with each plan and selects the lowest cost plan from the plans available. For example, referring again to FIG. 5, in one embodiment, the plan generator and cost determination module 422 determines two plans 504 for Query Scenario 1 502. In the illustrated embodiment, the plan generator and cost determination module 422 generates a first plan 504a that includes a table scan on table A and a nested loop join and a second plan 504b that includes an index scan on table A and an indexed join. The plan generator and cost determination module 422 determines a cost associated with each plan and selects the lowest cost plan, which corresponds to the second plan 504b as an index scan is more efficient than a table scan and an indexed join is more efficient than a nested loop join.

Present systems may be capable of generating plans similar to 504a and 504b for Query Scenario 1 502; however, a distinguishing attribute of the set operation module 322 is the plans generated when a table lacks a real index. A real index, which may occasionally be referred to as an "index," is a traditional index structure including one or more columns and associated with a table. Often, a real index is maintained (e.g. updated) and used to expedite searching of the table with which it is associated. For example, assume TABLEA of Query Scenario 1 502 lacks a real index (e.g. the line "Create index indA1 on TABLEA (a1,a2);" is omitted from the Query Scenario 502. A present system may select plan 504a as plan 504b is no longer available. However, plan 504a does not take advantage of the fact that one or more of the unioned tables (i.e. TABLEB and TABLEC) are indexed. Under such circumstances, the set operation module 322, unlike present systems, beneficially generates one or more plans other than, or in addition to, plan 504a to be evaluated and potentially selected for execution.

The plan generator and cost determination module 422 receives the set operation query including one or more set operations. In one embodiment, the set operation query includes a plurality of types of set operation. For example, the plan generator and cost determination module 422 receives the set operation query 508, which includes both union and join type set operations as illustrated in FIGS. 5-8.

The plan generator and cost determination module 422 adds one or more nodes to a query tree based on the set operation query. In one embodiment, the plan generator and cost determination module 422 adds a node to a query tree for each set operator in the set operation query. For example, assume, again, that set operation query 508 is received; in one embodiment, the plan generator and cost determination module 422 determines that the query includes a single join operator and a single union operator and adds an augmented nested loop (ANL) join node 610 and a union node 612 to a query tree as illustrated in query trees 600, 700 and 800 of FIGS. 6, 7 and 8, respectively.

In one embodiment, the plan generator and cost determination module 422 passes the query tree to the real index determination module 432. In one embodiment, the plan generator and cost determination module 422 stores the query tree in memory 204 (or any other non-transitory storage medium communicatively accessible) and other modules of the set operation module 322 including, e.g., the real index determination module 432, may retrieve the query tree by accessing the memory 204 (or other non-transitory storage medium).

The real index determination module 432 of the virtually indexed subtree determination module 424 inserts a retrieval node into the query tree for each table associated with the query. For example, referring to Example Query Scenarios 2-4 of FIG. 6-8, the real index determination module 432 adds a retrieval node 614 for TABLEA, a retrieval node 616 for TABLEB and a retrieval node 618 for TABLEC to the query tree 600, 700, 800.

In one embodiment, the real index determination module 432 inserts an index scan retrieval node into the query tree for each queried table that has a real index and inserts a table scan retrieval node into the query tree for each queried table that lacks a real index. For example, referring to Example Query Scenarios 2-4 of FIG. 6-8, according to one embodiment, the real index determination module 432 inserts a table scan node 614 for TABLEA into the query tree 600, 700, 800 because TABLEA lacks a real index in Example Query Scenarios 2-4 of FIG. 6-8, and the real index determination module 432 inserts an index scan node 616 on columns (b1,b2) for TABLEB into the query tree 600, 700, 800 because TABLEB is associated with a real, composite index (b1,b2) in Example Query Scenarios 2-4 of FIG. 6-8. Referring to Example Query Scenario 2 of FIG. 6, according to one embodiment, the real index determination module 432 inserts an index scan node 618a on columns (c1,c2) for TABLEC into the query tree 600 because TABLEC is associated with a real, composite index (c1,c2) in Example Query Scenario 2 of FIG. 6. Referring to Example Query Scenario 3 of FIG. 7, according to one embodiment, the real index determination module 432 inserts an index scan node 618b on columns (c2) for TABLEC into the query tree 700 because TABLEC is associated with a real index (c2) in Example Query Scenario 3 of FIG. 7. Referring to Example Query Scenario 4 of FIG. 8, according to one embodiment, the real index determination module 432 inserts a table scan node 618c on columns (c1,c2) for TABLEC into the query tree 800 because TABLEC lacks a real index in Example Query Scenario 4 of FIG. 8.

The real index determination module 432 determines whether at least one of the tables to be unioned, which are occasionally referred to a "unioned tables," is associated with a real index. For example, assuming the query 508 is received, the real index determination module 432 determines whether TABLEB and/or TABLEC are associated with a real index.

Responsive to determining the real index determination module 432 determines none of the unioned tables include a real index, the query tree is returned to the plan generation and cost determination module 422 for cost analysis and potential selection. It should be recognized that when the real index determination module 432 determines none of the unioned tables include a real index, the query tree is similar to plan 504a of FIG. 5.

In one embodiment, the real index determination module 432 passes the query tree to the plan generation and cost determination module 422. In one embodiment, the real index determination module 432 stores the query tree in memory 204 (or any other non-transitory storage medium communicatively accessible) and other modules of the set operation module 322 including, e.g., the plan generation and cost determination module 422, may retrieve the query tree by accessing the memory 204 (or other non-transitory storage medium).

Responsive to determining that at least one of the unioned tables is associated with a real index, the real index determination module 432 determines the largest order real index among the unioned tables for each union node of the query tree. For example, referring to Example Query Scenarios 2-4 of FIG. 6-8, according to one embodiment, the real index determination module 432 determines the largest order real index is a second order real index. This may be verified by reviewing real Example Query Scenarios 2-4 of FIG. 6-8, where the unioned tables are TABLEB, which has a second order, real index in Example Query Scenarios 2-4, while the order of TABLEC's index varies from 2 (i.e. complex index) to 0 (i.e. no index) depending on the query scenario 602, 702, 802.

In one embodiment, the real index determination module 432 passes the query tree and largest order index to the restriction module 434. In one embodiment, the real index determination module 432 stores the query tree and largest order index in memory 204 (or any other non-transitory storage medium communicatively accessible) and other modules of the set operation module 322 including, e.g., the restriction module 434, may retrieve the query tree and largest order index by accessing the memory 204 (or other non-transitory storage medium).

The restriction module 434 inserts restriction nodes when there are non-uniform indices. In one embodiment, the restriction module 434 inserts restriction nodes into a union subtree of the query tree when there are non-uniform indices in the unioned tables of that subtree.

The restriction module 434 inserts a restriction node between a union node and a table retrieval node in the query tree when there is a difference between the index order of that retrieval node and the largest order index determined by the real index determination module 432 for that union node. For example, referring to Query Scenario 2 of FIG. 6, the restriction module 434 receives the largest order index for unioned tables TABLEB and TABLEC, which is 2, from the real index determination module 432, and inserts no restriction node between the retrieval node 616 for TABLEB and the UNION node 612 because TABLEB has an index of order 2 and inserts no restriction node between the retrieval node 618a for TABLEC and the UNION node 612 because TABLEC has an index of order 2. In another example, referring to Query Scenario 3 of FIG. 7, the restriction module 434 receives the largest order index for unioned tables TABLEB and TABLEC, which is 2, from the real index determination module 432, and inserts no restriction node between the retrieval node 616 for TABLEB and the UNION node 612 because TABLEB has an index of order 2 and inserts a restriction node 620b between the retrieval node 618b for TABLEC and the UNION node 612 because TABLEC has an index of order 1. In another example, referring to Query Scenario 4 of FIG. 8, the restriction module 434 receives the largest order index for unioned tables TABLEB and TABLEC, which is 2, from the real index determination module 432, and inserts no restriction node between the retrieval node 616 for TABLEB and the UNION node 612 because TABLEB has an index of order 2 and inserts a restriction node 620c between the retrieval node 618c for TABLEC and the UNION node 612 because TABLEC has an index of order 0 (i.e. no index).

In one embodiment, the restriction module 434 inserts a restriction node having an order equal to the difference between the index order of the table retrieval node and the largest index order for the union node. For example, referring to Query Scenario 3 of FIG. 7, the restriction module 434 inserts a first order restriction node 620b (restriction on one column—c1) between the retrieval node 618b for TABLEC and the UNION node 612 because TABLEC has an index of order 1 and the largest order index is of the second order (i.e. 2−1=1 so restriction node is first order). In another example, referring to Query Scenario 4 of FIG. 8, the restriction module 434 inserts a second order restriction node 620c (restriction on two columns—c1,c2) between the retrieval node 618c for TABLEC and the UNION node 612 because TABLEC has an index of order 0 (i.e. no real index) and the largest order index is of the second order (i.e. 2-0=2 so restriction node is second order).

In one embodiment, the restriction module 434 passes the query tree to the virtual index module 436. In one embodiment, the restriction module 434 stores the query tree in memory 204 (or any other non-transitory storage medium communicatively accessible) and other modules of the set operation module 322 including, e.g., the virtual index module 436, may retrieve the query tree by accessing the memory 204 (or other non-transitory storage medium).

The virtual index module 436 projects a virtual index for the unioned tables. In one embodiment, a virtual index is one or more of non-persistent and dynamically generated. For example, in one embodiment, the virtual index is an amalgamation that includes the real indices of the unioned tables that is dynamically generated (i.e. generated subsequent to receiving the query and changes based on the query received) and non-persistent (i.e. is not maintained or stored after the query is processed). For example, referring to FIG. 6, at UNION node 612 the virtual index module 436 represents a virtual index that abstracts the real and persistent indices of TABLEB and TABLEC as determined by the real index determination module 432 at nodes 616 and 618a. In one embodiment, for each row retrieved from TABLEA at node 614, the ANL JOIN node 610 asks the UNION virtual index of node 612 to return qualified rows. The virtual index module 436, at UNION virtual index node 612, in turn queries the real indices of TABLEB and TABLEC retrieved at nodes 616 and 618a, respectively, to obtain qualified rows.

In one embodiment, the virtual index module 436 projects the virtual index of the query tree to the plan generator and cost determination module 422. In one embodiment, the plan generator and cost determination module 422, based on the projected virtual index, calculates a cost associated with the query plan (i.e. the query tree). In one embodiment, the plan generator and cost determination module 422, based on the projected virtual index, calculates a cost for the union subtree that is the sum of the real indices associated with that union subtree.

In one embodiment, the virtual index module 436 passes the query tree to the plan generator and cost determination module 422. In one embodiment, the virtual index module 436 stores the query tree in memory 204 (or any other non-transitory storage medium communicatively accessible) and other modules of the set operation module 322 including, e.g., the plan generator and cost determination module 422, may retrieve the query tree by accessing the memory 204 (or other non-transitory storage medium).

When the plan generator and cost determination module 422 determines the query tree is the plan with the lowest cost based on the projected virtual index, that query plan is selected for execution. In some cases, a query tree/plan similar to 600/700/800, with the a virtual index, index scan(s), possibly restrict node(s), etc. may be more efficient than a plan similar to plan 504*a*. Accordingly, the set operation module 322 as described above may generate more and better query plan alternatives as compared to existing systems and result in improved query performance.

Example Offset and Ordering Module 324

Figures 10, 11:
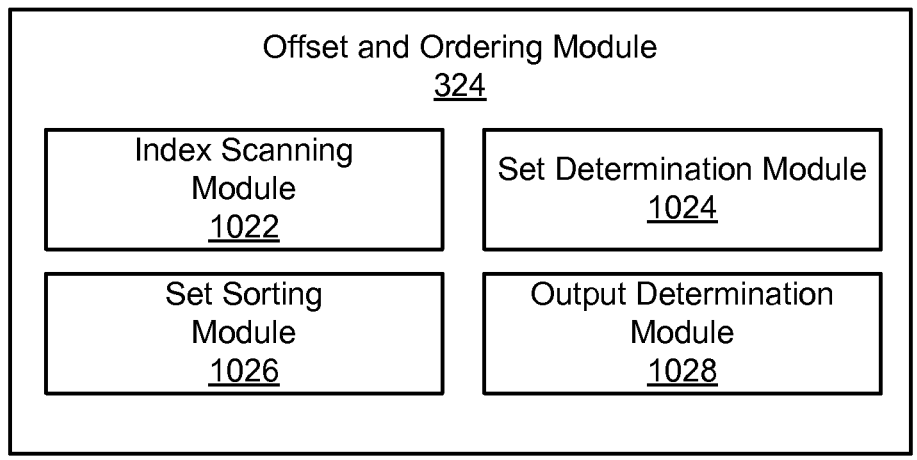
FIG. 10 is a block diagram illustrating an example of an offset and ordering module according to one embodiment.
FIG. 11 are example query conditions according to one embodiment.

Referring now to FIG. 10, an offset and ordering module 324 is shown in more detail according to one embodiment. FIG. 10 is a block diagram illustrating an example of an offset and ordering module 324 according to one embodiment.

The offset and ordering module 324 provides optimization for an offset type query, which may occasionally be referred to simply as an "offset query" herein. An offset query is a query type that skips X rows and returns the next Y rows. For example, assume an application 109 displays ten results per page and the user would like to view the second page; in one embodiment, an offset query would skip the first ten rows and fetch the next ten rows.

In one embodiment, the offset query is a Structured Query Language (SQL) offset/fetch query. The offset/fetch query was introduced in SQL 2008. However, it should be recognized that the disclosure herein is not limited to SQL 2008 and later versions which support the offset/fetch query, but may be applied to other databases and query languages that support an offset type query.

Depending on the embodiment, the offset value, X, and fetch value, Y, may be pre-programmed/determined by the application 109, user 112 defined or a combination thereof. For example, in the paginated results example above, the fetch value of Y=10 rows is determined by the application 109 since the application 109 displays 10 results at a time, and the offset value of X=10 is user 112 defined based on user input (i.e. the user selecting a second page of results).

In some use cases, in order for the rows that are fetched using an offset query to be useful, the rows must be sorted. Depending on the size (e.g. number of rows) of the table being queried, such sorting may be computationally expensive and time consuming. For clarity and convenience, the offset and ordering module's 324 features, functionality and advantages are described herein with reference to an example. It should be noted that the example is illustrative and the disclosure herein is not limited merely to the provided example. The disclosure herein may be applied to a wide variety of tables having one or more of different dimensions (e.g. different number of rows and/or columns), different data types (e.g. float, Boolean, varchar, etc.), different index types (e.g. a compound index), etc.

Referring now to FIG. 11, Example A is defined. In Example A, a table titled "tab1" has two columns titled "col1" and "col2" with "col1" being an index, and tab1 has the rows and values shown in table 1104. In Example A, the query 1102 "select * from tab1 order by col1,col2 offset 3 rows fetch first 3 rows only" is received.

To better understand the differences and advantages of the offset and ordering module 324 over existing systems, it is useful to compare its offset query processing to that of existing systems. Referring now to FIG. 12, an example of a query scenario which may be used by existing systems is described. FIG. 12 describes Query Scenario A, which may be implemented by an existing system responsive to receiving an offset query, e.g., offset query 1102. As described in FIG. 12, an existing system performs a table scan 1202 to obtain the queried table, which in the context of Example A is tab1 1104. The existing system then sorts 1206 all rows of the queried tables as defined by the offset query, which in the context of example A is sorting all rows of tab1 on col1 and col2 to produce a sorted table 1208. The existing system then skips the number of rows determined by the offset value (3 in the context of Example A) and fetches the number of rows defined by the fetch value (3 in the context of Example A) and returns the result (table 1212 in the context of Example A).

It should be recognized that Query Scenario A is less than ideal for at least two reasons. First, Query Scenario A does not utilize the index (col1 of Example A) of the queried table (table 1104 of Example A). Second, Query Scenario A relies upon sorting the entirety of the queried table (table 1104 of Example A). While sorting all nine rows of table 1104 of Example A may seem insignificant, when the queried table has thousands, tens of thousands or more rows, the burden of sorting all rows of the table becomes more apparent in both terms of time and computation resources, since sorting such large numbers of rows would likely require multiple input/output (I/O) events as portions of the queried table are read into main memory (e.g. RAM) sorted and written back to disk. The offset and ordering module 324 provides alternative query processing, which is discussed below with reference to Query Scenario B of FIG. 13 and the pseudo algorithm of FIGS. 15A-B, and may result in increased performance over Query Scenario A and does not suffer from the above deficiencies of Query Scenario A.

Referring now to FIG. 10, in some embodiments, the offset and ordering module 324 may include an index scanning module 1022, a set determination module 1024, a set sorting module 1026 and an output determination module 1028. It will be recognized that the modules 1022, 1024, 1026, 1028 comprised in the offset and ordering module 324 may not necessarily all reside on the same data server 122. In one embodiment, the modules 1022, 1024, 1026, 1028 and/or their functionality are distributed across multiple data servers 122.

A sub-module 1022/1024/1026/1028 of the offset and ordering module 324 may include code and routines for providing the functionality associated with the sub-module as described below. In some embodiments, a sub-module 1022/1024/1026/1028 includes a set of instructions executable by the processor 202. In some embodiments, a sub-module 1022/1024/1026/1028 is stored in the memory 204 and is accessible and executable by the processor 202. Regardless, a sub-module 1022/1024/1026/1028 is adapted for cooperation and communication with the processor 202, other components of the data server 122 and other components (e.g. other sub-modules) of the offset and ordering module 324.

The index scanning module 1022 performs an index scan on the table associated with the query. The table associated with the query is occasionally referred to herein as the "queried table" or as the "query table." The table resulting from the index scan of the query table is occasionally referred to herein as an "indexed table."

Referring now to FIG. 13, Query Scenario B is described. In the illustrated embodiment, the index scanning module 1022 performs an index scan 1302 to retrieve the rows of the queried table 1104. An index scan is generally faster and more efficient than a table scan and results in the sorting of the queried table 1104 based on the index (i.e. col1) upon retrieval. This can be seen in indexed table 1304, which shows that the queried table 1104 of Example A has been reordred based on col1 values (i.e. the index of the queried table 1104 in Example A).

Referring again to FIG. 10, in some embodiments, the index scanning module 1022 performs an index scan responsive to satisfaction of one or more preconditions. Examples of preconditions may include, but are not limited to, the query table including a real index, the query ordering the query table according to a real index and the query ordering the query table by the index first. In some embodiments, when one or more of the preconditions is unsatisfied, the offset and ordering module 324 and therefore the index scanning module 1022 does not execute. In some such embodiments a scenario similar to that of Query Scenario A is executed instead.

In one embodiment, the index scanning module 1022 passes the indexed table to the set determination module 1024. In one embodiment, the index scanning module 1022 stores the indexed table in memory 204 (or any other non-transitory storage medium communicatively accessible) and other modules of the offset and ordering module 324 including, e.g., the set determination module 1024, may retrieve the indexed table by accessing the memory 204 (or other non-transitory storage medium).

The set determination module 1024 determines a set of one or more rows for further sorting. The set of one or more rows for further sorting is occasionally referred to herein as a "work set," "working set," "current work set," "current working set" or similar. In one embodiment, the work set is a subset of rows of the sort table.

In one embodiment, the set determination module 1024 determines the set when the query orders the table by at least on column in addition to the real index used in the index scan. In one embodiment, when the query orders the query table only by one or more indices of the query table, the offset and fetch may be performed without further sorting as the index scan alone provides the sorting necessary for the output determination module to determine and output an accurate result.

In one embodiment, the set determination module 1024 determines the work set based at least in part on the values of the index used in the index scan to create the indexed table. Referring again to FIG. 13, it should be recognized that if the offset and fetch were performed on the indexed table 1304, the col1 values (i.e. index values) fetched would be correct; however, the col2 values would not necessarily be correct.

The set determination module 1024 determines the index column value(s) of the one or more rows to be fetched based on the offset query. In the case of Example A and indexed table 1304 of FIG. 13, the set determination module 1024 determines that the index column values of rows 4-6 (i.e. the rows to be fetch based on the query to skip 3 rows and fetch the next 3 rows) are "4" and "5." Accordingly, the set determination module 1024 determines the work set is all rows that have a col1 value of 4 or 5.

Depending on the embodiment, the work set may be determined in different ways. Similarly, depending on the embodiment, the work set may include different information. For example, the work set may include an identification of a range of rows (e.g. row 3-7), an identification of the index value range (e.g. col1 values 4-5), an identification of the first and last index values (e.g. col1 value of 4 and col1 value 5), the rows of the work set (e.g. {(4,5), (4,8), (4,7), (5,10), (5,7)}), etc.

Referring again to FIG. 10, in one embodiment, the set determination module 1024 passes the work set to the set sorting module 1026. In one embodiment, the set determination module 1024 stores the work set in memory 204 (or any other non-transitory storage medium communicatively accessible) and other modules of the offset and ordering module 324 including, e.g., the set sorting module 1026, may retrieve the work set by accessing the memory 204 (or other non-transitory storage medium).

In one embodiment, the set determination module 1024 determines the number of rows that precede the first row of the work set. The number of rows that precede the first row of the work set is occasionally referred to herein as the "skipped rows, "skipped row count" or similar. In some embodiments, the rows that precede the first row of the work set are not sorted by the set sorting module 1026, which is discussed below, and therefore are said to be "skipped." However, according to some embodiments, the output determination module 1028, which is discussed below, may need to know how many rows were skipped in order to determine which rows from a sorted work set to output based on the offset query.

In one embodiment, the set determination module 1024 passes the skipped row count to the output determination module 1028. In one embodiment, the set determination module 1024 stores the skipped row count in memory 204 (or any other non-transitory storage medium communicatively accessible) and other modules of the offset and ordering module 324 including, e.g., the output determination module 1028, may retrieve the skipped row count by accessing the memory 204 (or other non-transitory storage medium).

The set sorting module 1026 retrieves the rows of the work set and sorts those rows based at least in part on values of another column. Under some circumstances, the work set is a subset of the queried table that includes less than all the rows of the queried table. The set sorting module 1026, by not sorting one or more of the rows preceding the work set and the rows following the work set, provides greater efficiency in terms of both time and processing resources over current systems, which may use something similar to Query Scenario A of FIG. 12. This efficiency gain increases as the size of the work set relative to the total size of the query table decreases.

The set sorting module 1026 retrieves the rows of the work set. The set sorting module's 1026 retrieval of the rows of the work set may vary depending on the embodiment and the content of the work set. For example, in an embodiment in which the work set includes the rows of the work set (e.g. {(4,5), (4,8), (4,7), (5,10), (5,7)}), the set sorting module 1026 retrieves the rows of the work set when the work set is obtained. In another example, in an embodiment in which the work set includes a row range or index range (e.g. rows 3-7 or col1 values 4-5, respectively), the set sorting module 1026 may need to retrieve the rows (and possibly determine the appropriate rows prior to retrieval).

The set sorting module 1026 sorts the rows of the work set based at least in part on another column. In one embodiment, the another column is one or more columns of the query table other than the one or more columns upon which the index scanning module 1022 performed an index scan. In some embodiments, the another column is not an index of the query table. In some embodiments, the another column is determined based on the offset query. For example, referring again to Example A and FIG. 11, the set sorting module 1026 determines the another column is col2 based on the query 1102 and that the index scan is performed on col1—the query table's 1104 index.

Referring back to FIG. 10, the set sorting module 1026 sorts rows of the work set having the same values in the one or more columns used by the index scanning module 1022 to perform the index scan based on the second column's values. This may be seen by referring to table 1310 of FIG. 13 in which the set sorting module 1026 arranges rows having col1 values of 4 in order according to their col2 values and arranges the rows having col1 values of 5 in order according to their col2 values. To clarify and simplify, the set sorting module 1026 orders the rows of the work set by the one or more scanned index rows and the one or more another rows (i.e. order by col1,col2 in the context of Example A).

In one embodiment, the set sorting module 1026 passes the sorted work set to the output determination module 1028. In one embodiment, the set sorting module 1026 stores the sorted work set in memory 204 (or any other non-transitory storage medium communicatively accessible) and other modules of the offset and ordering module 324 including, e.g., output determination module 1028, may retrieve the sorted work set by accessing the memory 204 (or other non-transitory storage medium).

The output determination module 1028 determines the output rows. The output rows are the rows to be fetched and returned to the caller/client (e.g. application 109). In one embodiment, the output rows are the one or more rows from the sorted work set, occasionally referred to herein as "sorted rows," that are to be returned to the client based on the offset query. For example, in one embodiment, the output determination module 1028 receives the offset query including an offset value and a fetch value and receives a skipped row count and determines the rows from the sorted work set to return based on the offset value, fetch value and skipped row count. Referring again to FIG. 13, the output determination module 1028 determines to retrieve rows 2-4 of the sorted work set (which correspond to rows 4-6 of table 1310) based on the offset value (i.e. 3), the fetch value (i.e. 3) and the skipped row count (i.e. 2, which is the number of rows before the first row having a col1 value of 4 and marks the beginning of the work set).

In some embodiments, the output determination module 1028 may output the determined rows, which in the context of Example A may appear similar to table 1314 of FIG. 13. In one embodiment, the output determination module 1028 passes the output to the client device 106. In one embodiment, the output determination module 1028 stores the output in memory 204 (or any other non-transitory storage medium communicatively accessible) and the client device 106, e.g., via the application 109 and/or driver 228, may retrieve the output by accessing the memory 204 (or other non-transitory storage medium).

The implementation of module 324 and its sub-modules 1022, 1024, 1026, 1028 may be different than that described above. For example, the module 324 may divide or combine the functionality described above into different modules. For example, FIG. 15A-B refers to a "sort engine," which combines functionality described above with reference to the set determination module 1024, the set sorting module and output determination module 1026.

Referring now to FIGS. 15A-B, an example pseudo algorithm executed by the offset and ordering module 324 is described according to one embodiment. However, it should be recognized that this is merely one embodiment and other embodiments implementing different pseudo algorithms for processing an offset query are contemplated and covered by the disclosure herein. For example, the disclosure herein is broad and covers other approaches for determining a work set as discussed with reference to the modules of FIG. 10.

Similar to Query Scenario B of FIG. 13, the example pseudo algorithm of FIG. 15A begins 1502 by retrieving the rows from the query table using an index scan. The offset and fetch values of the query are provided 1504 to the sort engine. The sort engine defines 1506 variables that are used by the algorithm 1508 of FIG. 15B. Referring now to FIG. 15B, the algorithm 1508 determines the work set, sorts the work set and determines the output rows. As the algorithm 1508 is included in FIG. 15B, the algorithm will not be reproduced, but a general description of the algorithm's 1508 conceptual structure is provided.

The algorithm 1508 conceptually divides an indexed table into three portions. A first portion of rows having the position less than or equal to the offset value plus one. For Example A, this first portion corresponds to rows 1-4 of table 1304. The second portion includes rows having a position greater than the sum of the offset value and the fetch value. For Example A, this second portion corresponds to rows 7-9 of table 1304. The third portion are the rows that are not included in the first or second portions, i.e. rows having a position greater than the offset value plus one and less than or equal to the sum of the offset and fetch values. For Example A, this third portion corresponds to rows 5-6 of table 1304. The algorithm 1508, beginning with the first row as the input row and proceeding in order from there, determines with which portion of the indexed table the input row is associated.

Portion 1508*a* of the algorithm 1508 is executed when the input row is included in the first portion of the indexed table (i.e. "ROW_COUNT" is <=OFFSET_VALUE+1). Portion 1508*a* ensures that a row that precedes the row having the position of the offset value plus one and that also has the same value(s) used by the index scan to order the rows in the index table (i.e. "DONE_SORT_KEYS") as that row is included in the work set (i.e. "CURRENT_WORK_SET"). In the context of Example A, it should be understood that portion 1508*a* of the algorithm 1508 ensures that row 3 of table 1304, which precedes row 4 (i.e. the row having the offset value, which is 3, plus 1 position) and has a col1 value of 4 (i.e. the same column value used by the index scan to order the rows in the index table as row 4), is included in the work set. Portion 1508*a* also keeps track of how many rows are skipped (i.e. SKIPPED_ROW_COUNT) before the first row of the work set, which in the context of Example A is 2, since the first two rows are skipped.

Portion 1508*b* of the algorithm 1508 is executed when the input row is included in the second portion of the indexed table (i.e. "ROW_COUNT" is >than OFFSET_VALUE+ FETCH_VALUE). Portion 1508*b* ensures that a row that follows the row having the position of the offset value plus the fetch value and that also has the same value(s) used by the index scan to order the rows in the index table (i.e. "DONE_SORT_KEYS") as that row is included in the work set (i.e. "CURRENT_WORK_SET"). In the context of Example A, it should be understood that this portion 1508*b* of the algorithm 1508 ensures that row 7 of table 1304, which follows row 6 (i.e. the row having the offset value, which is 3, plus the fetch value, which is also 3, position) and has a col1 value of 5 (i.e. the same column value used by the index scan to order the rows in the index table as row 6), is included in the work set.

Portion 1508*b* also determines when to stop iterating through the index table and to sort the work set. In the context of Example A, it should be understood that this portion 1508*b* of the algorithm 1508 upon reaching row 8 of table 1304, determines no further rows need to be input and the work set (i.e. rows 3-7) should be sorted and the output (i.e. "OUTPUT_ROWS") determined and output 1510 to the caller (e.g. application 109).

Portion 1508*c* of the algorithm 1508 is executed when the input row is included in the third portion of the indexed table (i.e. "ROW_COUNT" is nether <=the OFFSET_VALUE+1 nor >than the OFFSET_VALUE+FETCH_VALUE). Portion 1508c includes the rows in the third portion of the indexed table in the work set (i.e. "CURRENT_WORK_SET"). In the context of Example A, it should be understood that this portion 1508c of the algorithm 1508 ensures that rows 5-6 of table 1304 (i.e. the rows having a position greater than the offset value plus one and less than or equal to the sum of the offset and fetch values) are included in the work set.

Referring now to FIG. 16, an example of intermediary results for the pseudo algorithm of FIGS. 15A-15B when applied to Example A of FIG. 11 are shown. As illustrated, indexed table 1304 is obtained at 1602 by retrieving the rows of the query table 1104 using an index scan as described in FIG. 15A at 1502 of the pseudo algorithm. The step-by-step execution of the pseudo algorithm of FIGS. 15A-15B and intermediary variable values are shown at 1606 in table 1608.

Example Methods

Figure 9:
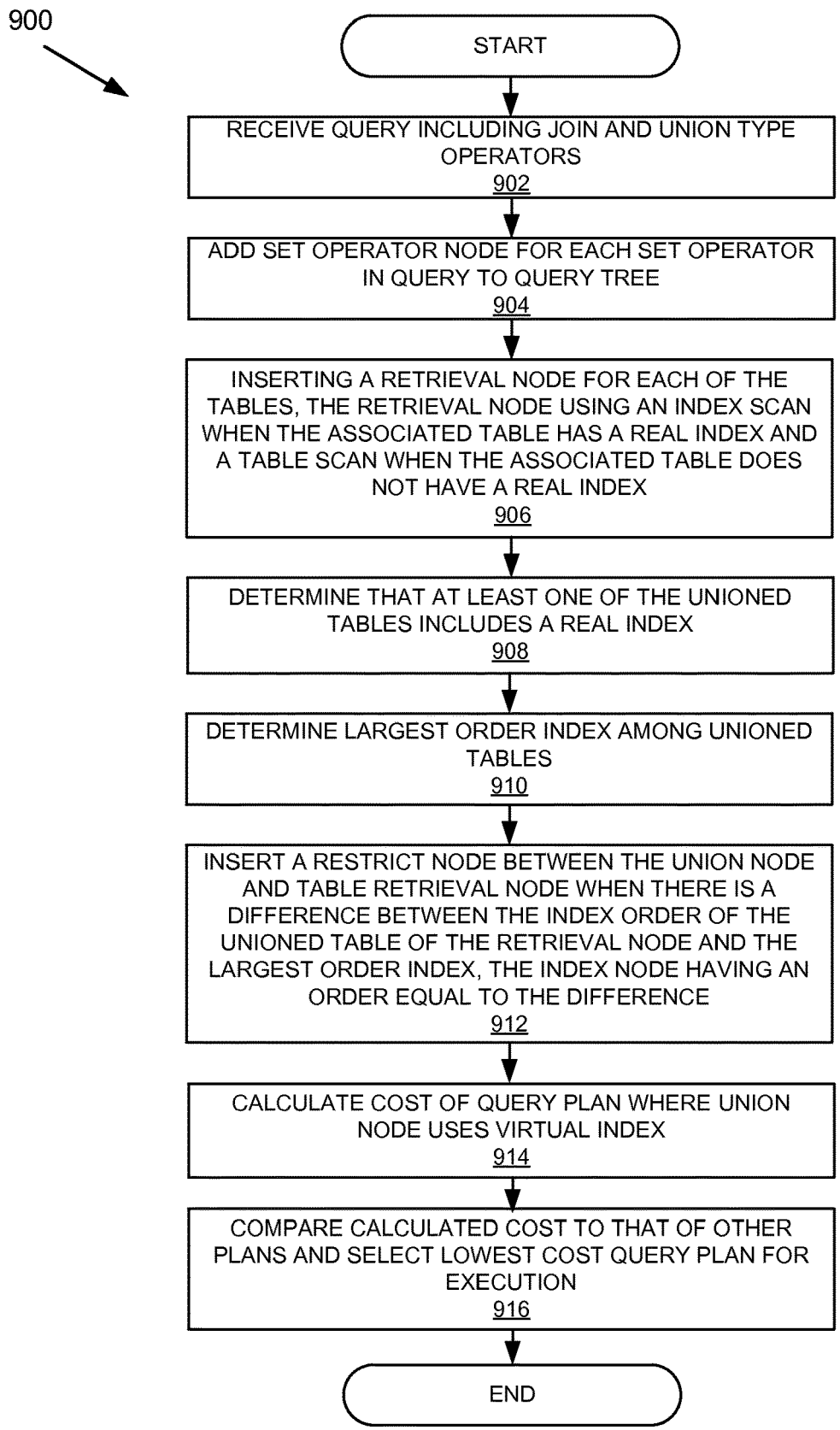
FIG. 9 is a flowchart of an example method for set operation query optimization according to one embodiment.

FIG. 9 depicts method 900 performed by the system described above in reference to FIGS. 1-4. The method 900 begins at block 902. At block 902, the plan generator and cost determination module 422 receives a set operation query including a join type set operator and a union type set operator. At block 904, the plan generator and cost determination module 422 adds a node for each of the set operators of the query received at block 902 to a query tree. At block 906, the real index determination module 432 of the virtually indexed subtree determination module 424 inserts a retrieval node for each table associated with the query received at block 902. In one embodiment, the real index determination module 432 inserts an index scan retrieval node into the query tree for each table that is associated with the query received at block 902 which has a real index and inserts a table scan retrieval node into the query tree for each table that is associated with the query received at block 902 which lacks a real index. At block 908, the real index determination module 432 determines that at least one of the unioned tables is associated with a real index. At block 910, the real index determination module 432 determines the largest order real index among the tables to be unioned based on the query received at block 902. At block 912, the restriction module 434 of the virtually indexed subtree determination module 424 inserts a restriction node between a union node and a table retrieval node of the query tree when there is a difference between the index order of the retrieval node and the largest order index determined at block 910 for that union node. At block 914, the plan generator and cost determination module 422 calculates a cost associated with the query plan described by the query tree using a virtual index projected by the virtual index module 436 of the virtually indexed subtree determination module 424. At block 916, the plan generator and cost determination module 422 compares the cost calculated at block 914 with that of other query plans and selects the lowest cost query plan for execution.

Figure 14:
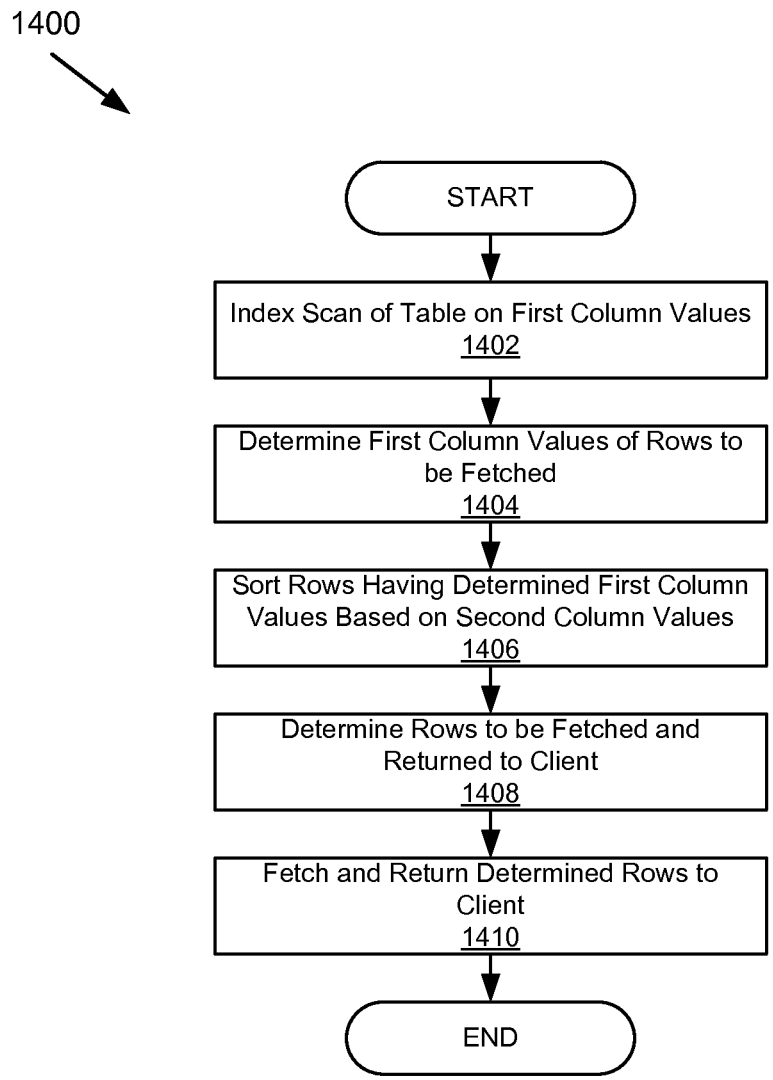
FIG. 14 is flowchart of an example method for offset and ordering optimization according to one embodiment.

FIG. 14 depicts method 1400 for offset and ordering optimization, which may be performed by the system described above in reference to FIGS. 1-3 and 10. The method 1400 begins at block 1402. At block 1402, the index scanning module 1022 performs an index scan on the first column of the table associated with the query. At block 1404, the set determination module 1024 determines the first column values of the rows to be fetched. At block 1406, the set sorting module 1026 sorts the rows determined at block 1404 based on second column values. At block 1408, the output determination module 1028 determines the sorted rows to be fetched and returned to the client. At block 1410, the output determination module 1028 fetches and returns the rows determined at block 1408 to the client.

Figure 17:
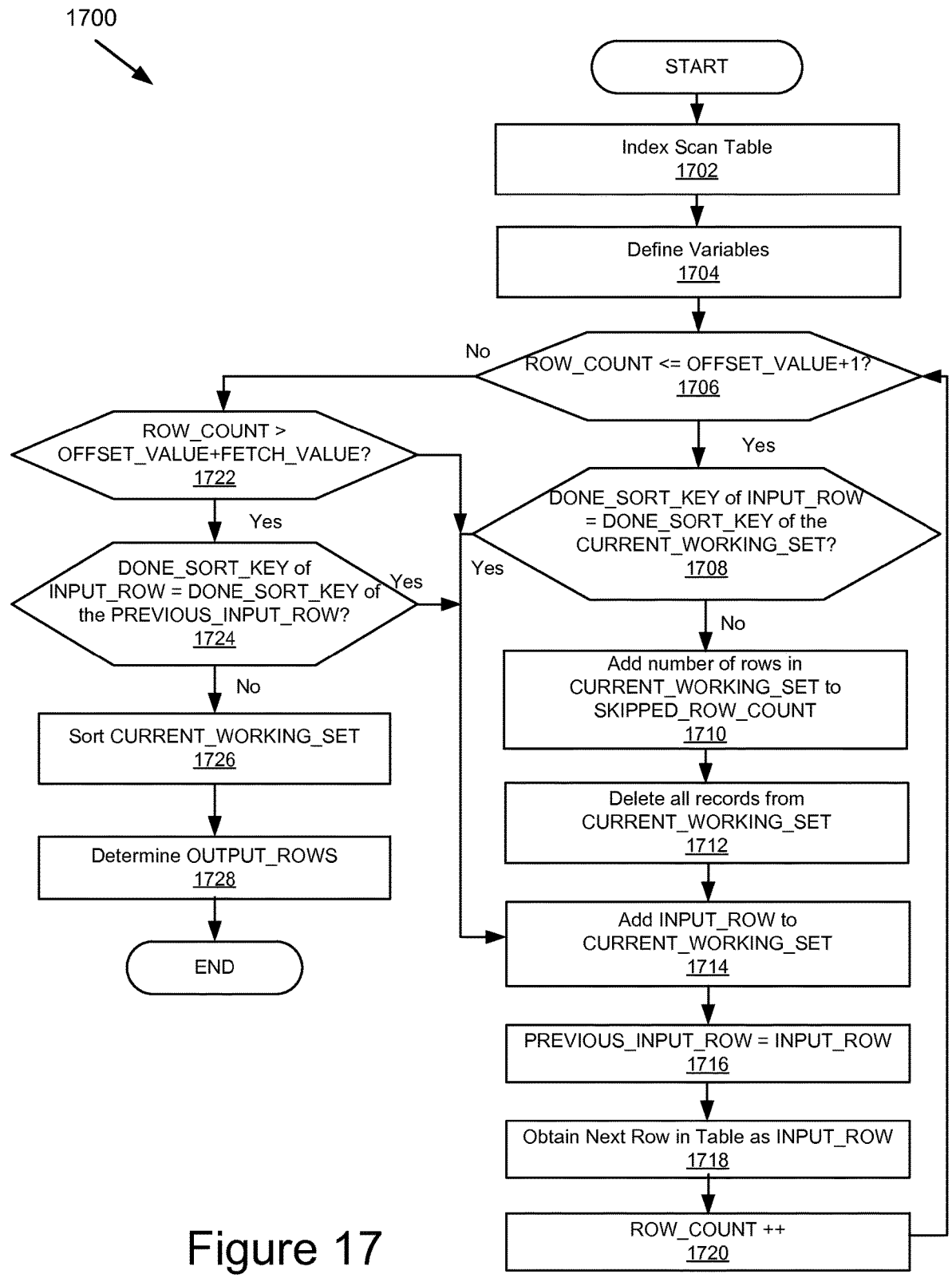
FIG. 17 is flowchart of another example method for offset and ordering optimization according to one embodiment.

FIG. 17 depicts method 1700 for offset and ordering optimization, which may be performed by the system described above in reference to FIGS. 1-3 and 10. The method 1700 begins at block 1702. At block 1702, the index scanning module 1022 performs an index scan of the table associated with the query. At block 1704, the set determination module 1024 defines variables. At block 1706, the set determination module 1024 determines whether the ROW_COUNT is less than or equal to the OFFSET_VALUE+1. When the ROW_COUNT is greater than the OFFSET_VALUE+1 (1706—No), the method 1700 continues at block 1722. When the ROW_COUNT is less than or equal to the OFFSET_VALUE+1 (1706—Yes), the method 1700 continues at block 1708.

At block 1708, the set determination module 1024 determines whether the DONE_SORT_KEY of the INPUT_ROW is the same as the DONE_SORT_KEY OF THE CURRENT_WORKING_SET. When the DONE_SORT_KEY of the INPUT_ROW is the same as the DONE_SORT_KEY of the CURRENT_WORKING_SET (1708—Yes), the method 1700 continues at block 1714. When the DONE_SORT_KEY of the INPUT_ROW is not the same as the DONE_SORT_KEY OF THE CURRENT_WORKING SET (1708—No), the method 1700 continues at block 1710.

At block 1710, the set determination module 1024 adds the number of rows in the CURRENT_WORKING_SET to the SKIPPED_ROW_COUNT. At block 1712, the set determination module 1024 deletes all records from the current working set before continuing to block 1714.

At block 1714, the set determination module 1024 adds the INPUT_ROW to the CURRENT_WORKING_SET. At block 1716, the set determination module defines the PREVIOUS_INPUT_ROW equal to the INPUT_ROW and then, at block 1718, obtains the next row from the indexed table as INPUT_ROW. At block 1720, the set determination module 1024 increments the ROW_COUNT by one and the method 1700 continues at block 1706. Blocks 1706, 1708, 1710, 1712, 1714, 1716, 1718 and 1720 may be repeated until the ROW_COUNT is greater than the OFFSET_VALUE+1 (1706—No) responsive to which, the method 1700 continues at block 1722.

At block 1722, the set determination module 1024 determines whether the ROW_COUNT is greater than the OFF_SET_VALUE+FETCH_VALUE. When the ROW_COUNT is less than or equal to the sum of the OFF_SET_VALUE and the FETCH_VALUE (1722—No), the method 1700 continues at block 1714 and blocks 1714, 1716, 1718, 1720, 1706 and 1722 are repeated until the ROW_COUNT exceeds the sum of the OFFEST_VALUE and FETCH_VALUE (1722—Yes). When the ROW_COUNT is greater than or equal to the sum of the OFF_SET_VALUE and FETCH_VALUE (1722—Yes), the method 1700 continues at block 1724.

At block 1724, the set determination module 1024 determines whether the DONE_SORT_KEY of the INPUT_ROW is the same as the DONE_SORT_KEY of the PREVIOUS_ROW. When the DONE_SORT_KEY of the INPUT_ROW is the same as the DONE_SORT_KEY of the PREVIOUS_ROW (1724—Yes), the method 1700 continues at block 1714 and blocks 1714, 1716, 1718, 1720, 1706, 1722 and 1724 are repeated until the DONE_SORT_KEY of the INPUT_ROW is not the same as the DONE_SORT_KEY of the PREVIOUS_ROW (1724—No). When the DONE_SORT_KEY of the INPUT_ROW is not the same as the DONE_SORT_KEY of the PREVIOUS_ROW (1724—No), the method 1700 continues at block 1726.

At block 1726, the set sorting module 1026 sorts the CURRENT_WORKING_SET. At block 1728, the output determination module 1028 determines the OUTPUT_ROWS that are fetched and returned to the client and the method 1700 ends.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc.

Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web-Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
   responsive to receiving an offset query of a query table including a first column and a second column, index scanning, using one or more processors, the query table on the first column of the query table thereby determining an index scanned query table sorted using an index of the query table included in the first column of the query table;
   determining, based on the offset query, a number of rows to be skipped within the index scanned query table;
   responsive to skipping the determined number of rows within the index scanned query table, identifying a value range of the index based on the offset query;
   determining, using the one or more processors, a subset of one or more rows from the index scanned query table by identifying each row that includes an index value within the identified value range of the index;
   further sorting, using the one or more processors, the subset of rows based in part on values from the second column of the query table, the subset of rows having previously been sorted based on the index by the index scanning and having index values within the identified value range; and
   determining, using the one or more processors, based on the offset query, one or more output rows to be fetched from the sorted subset of rows, wherein the subset of one or more rows is determined based on the offset query and values of the indexed first column, such that the subset of one or more rows has values for the first column that range from a first, first column value to a second, first column value, wherein the first, first column value is a first column value of row X, where X is based on an offset value from the offset query, and the second, first column value is a first column value of row Y, where Y is based on the sum of X and a fetch value from the offset query.

2. The computer-implemented method of claim 1 wherein sorting the subset of rows based in part on the second column arranges the one or more rows within the subset of rows that have a same first column value in order according to their second column value.

3. The computer-implemented method of claim 1 wherein the subset of rows is less than an entirety of the query table.

4. The computer-implemented method of claim 1, wherein the index is a composite index that includes a plurality of columns.

5. The computer-implemented method of claim 1, wherein the offset query requests that an output be ordered by the first column first.

6. The computer-implemented method of claim 1, wherein the offset query requests that an output be ordered by at least one column in addition to the first column upon which the index scan is performed.

7. The computer-implemented method of claim 1, wherein determining, based on the offset query, the one or more output rows to be fetched comprises:
   determining a first output row in the sorted subset of rows based on a number of rows to be skipped based on the offset value; and
   using the number of rows to be fetched based on the fetch value, determining a number of rows including the first output row to be fetched as the one or more output rows.

8. The computer-implemented method of claim 1, wherein the offset query uses structured query language (SQL) 2008 or later.

9. The computer-implemented method of claim 1 wherein the offset query includes an offset value defining the number of rows to be skipped and a fetch value defining a number of rows to be fetched after the number of rows defined by the offset value are skipped.

* * * * *